July 23, 1935.  W. H. STAPLES  2,009,031

CLUTCH MECHANISM

Filed Sept. 10, 1930

Inventor:
William H. Staples;
by Fay, Oberlin & Fay
Attorneys.

Patented July 23, 1935

2,009,031

UNITED STATES PATENT OFFICE 2,009,031

CLUTCH MECHANISM

William H. Staples, Cleveland, Ohio

Application September 10, 1930, Serial No. 480,945

4 Claims. (Cl. 192—69)

In the driving of intermittently operated mechanism and especially machine tools, particularly multiple unit type machines, such as hobbing machines, gear cutters, milling machines, etc., it has been a matter of considerable difficulty to attain a means for putting the respective units into drive engagement such as to afford a positive and quick control and yet insure safe operation. With engagement or disengagement of driven units by ordinary clutches, it is the usual experience that machines are wrecked in greater or less degree by failure of accurate and positive control. Particularly with multiple spindle machines, the margin of operating conditions is exceedingly close, and if the mechanism be of a type requiring careful compensation for wear, unless such compensation is accurately attended to as required, disaster to the machine is the usual result. A clutch construction providing quick and accurate control, and being highly durable and generally capable of operating smoothly and under full power requirements at all times is accordingly of fundamental importance and highly desirable.

To the accomplishment of the foregoing and related ends, the invention then, consists of the features hereinafter described and particularly pointed out in the claims, the following description and the annexed drawing setting forth in detail certain structure embodying the invention, this being illustrative, however, of but one of the various ways in which the principle of the invention may be employed.

In said annexed drawing:—

Figure 1:
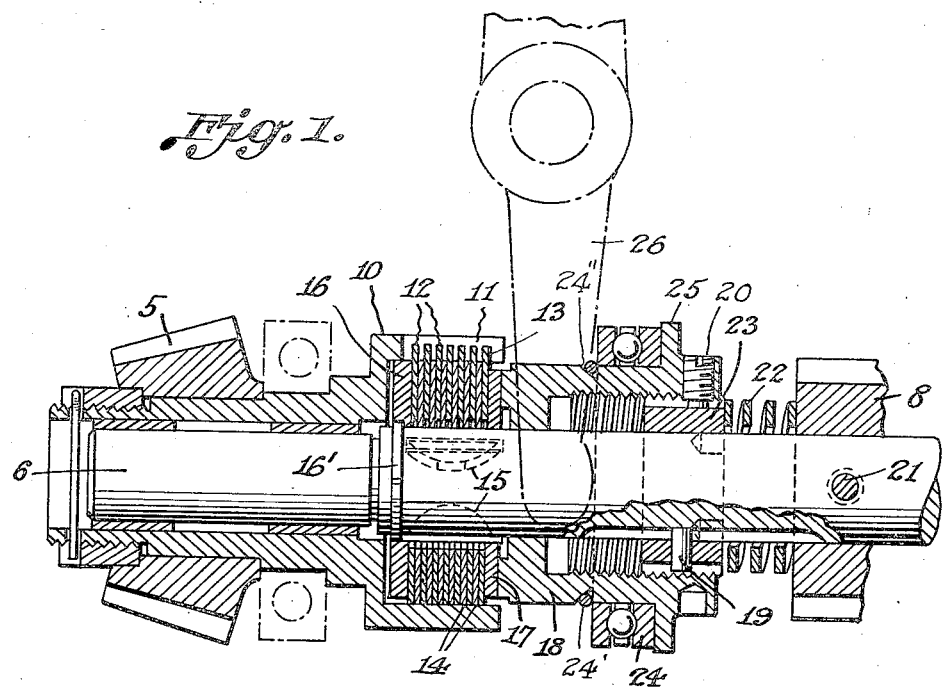
Figure 2:
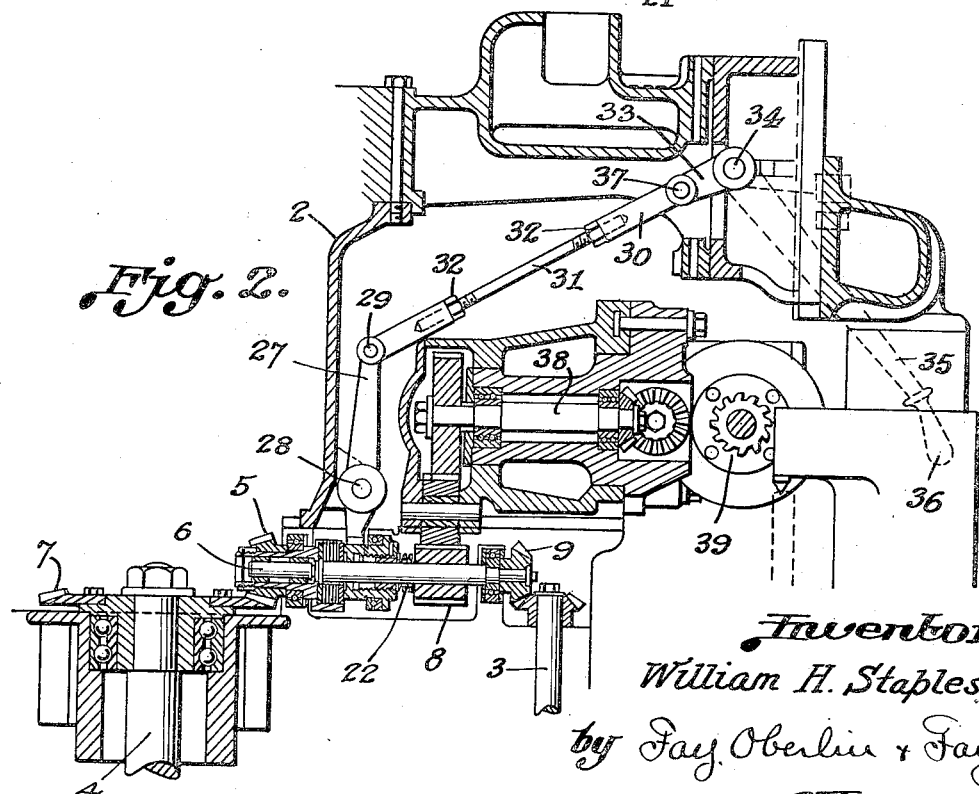

Fig. 1 is a fragmentary sectional view showing a portion of a multiple spindle machine and drive detail; and Fig. 2 is a detail sectional view on enlarged scale.

Referring more particularly to the drawing, there is shown a frame 2 of a multiple unit machine, for instance, a hobbing machine, and comprising frame-castings or pedestal and table within which are mounted a series of driven spindles 3, the precise further detail of which is immaterial. Mounted in such framing or pedestal is a main driving shaft 4, and in general relationship therewith are respective take-off drives, as for instance pinion 5 on a shaft 6, such gear being meshed with the gear 7 of the drive shaft 4. Fixed to the shaft 6 are pinions 8 and 9, the latter meshing with a corresponding pinion on spindle 3.

The pinion 5 is secured to a cup 10 which has cut-outs or slots 11, for instance at three points in its periphery about 120° apart. Seating within such slots are ears or projections 12 of a series of plates 13 which are thus held by the member 10 so as to rotate therewith, but being spaced free from the shaft 6 centrally. Interdigitating between such plates 13 is another series of plates 14 which centrally are notched to seat on keys 15, which are set into the shaft 6, the series of plates 14 thus turning with the shaft, but being spaced free from the member 10 peripherally. A backing plate 16 held against endwise displacement by a split ring 16' serves to confine the plates 13, etc. at one end, and a follower plate 17 riding loosely on shaft 6 serves generally to confine the plates from the other end. Arranged to work against the follower plate 17 is a collar 18 which is mounted for limited longitudinal movement relative to the shaft. Abutting against a fixed member, as for instance against gear 8 which is pinned to the shaft at 21 is a thrust spring 22 engaging in turn against the collar 18 or preferably against an adjustment bushing 23 thereof, the latter being provided with screw-threaded engagement in the collar proper and being splined to the shaft, for instance by a pin 19, so that the bushing and collar may move together longitudinally, and the collar may be very accurately adjusted as to its position, by appropriate turning-regulation on the screw-threaded bushing. A set screw 20 or the like may be provided for finally locking the collar and the bushing together in adjusted position. A ball bearing 24 is arranged on the exterior of the collar, for instance against a flange 25. The ball-bearing may be held for instance by a split ring 24' in groove 24''. Normally the spring 22 tends to thrust the collar 18 against the plates 13, 14, crowding them into driving engagement, whereby motion is transmitted through from the main drive shaft to the work feed spindle 3. In order to release such drive, a control involving a positive holdout means for overcoming the spring is provided, and including for instance a fork 26. The latter preferably forms one end of a lever 27 fulcrumed at 28 in ears projecting from the framing, and pivotally connected at end 29 to a link 30, which desirably is arranged with an adjustable take-up, as a rod 31 with adjusting nuts 32. At its other end the link 30 is connected to one arm 33 of a bell crank lever pivoted at 34, to the frame, and having its arm 35 extending out with an operating handle 36. The positioning of link 30 with respect to the lever arm 33 and the centering of points 29 and 34 is such that when the control handle 36 is shoved down into its lowermost position, the link 30 and arm 33 form a toggle whose knee 37 is back of center line and locks.

The mode of operation of the mechanism will be clear from the foregoing. With the main drive 7 continuously turning, motion is transferred to the pinion 5, but with the control handle 36 in its down position, as shown, the fork 26 is thrusting against the spring 22 and releasing the plates 13, 14, from mutual engagement, and the second shaft does not turn. When, however, it is desired to operate the unit, the control handle 36 is pulled out, thereby breaking the toggle at 37 and shoving the fork 26 back so that the spring 22 exerts its thrust, closing the plates 13, 14, together, and motion is transmitted through the second shaft and pinion 9 to work feed spindle 3, and through pinion 8 by further gearing to a shaft 38 which in turn drives the tool 39.

It will thus be seen that very accurate control may be had on the very exacting requirements of machine tool drive, such as to insure a positive hold-out, and the prevention of accidental engagement at undesired times through jarring. Again, the drive is elastic and in the event of jamming, no damage results to the operating end of the machine. Moreover, no critical compensative adjustment is necessitated on account of a large wear factor as is prevalent with drives heretofore customary in machine tool devices, and correspondingly the present mechanism wholly obviates the tendencies heretofore usual where such careful compensation had been neglected of undesirable runaway of the drive at inopportune times with damage to the tool or machine.

Other modes of employing the principle of the invention may be applied, change being made as regards the detail described provided the means stated in any of the following claims, or the equivalent of such, be employed.

I therefore particularly point out and distinctly claim as my invention:

1. In mechanism of the character described, a clutch comprising driving means and a shaft adapted to be driven by said driving means, including a cup member having peripheral slots, a series of plates having ears extending into said slots, a series of plates interdigitated with said first series of plates and rotatable with said shaft, a collar and a spring normally crowding said plates together through precision take-up means embodying said collar and a bushing splined to the shaft and having a screw-threaded engagement within the collar, and means for overcoming the action of said spring to break the driving connection.

2. In mechanism of the character described, a clutch comprising driving means and a shaft adapted to be driven by said driving means, including a cup member having peripheral slots, a series of plates having ears extending into said slots, a series of plates interdigitated with said first series of plates and rotatable with said shaft, a backing plate and a split retaining ring at one end of the plate series, a collar at the other end slideable on said shaft toward and away from said plates, a spring normally moving said collar toward said plates, means inside said collar to receive the thrust of said spring, a lever for moving said collar away from said plates, a ball-bearing between said lever and said collar, and a groove and ring for retaining the ball-bearing on said collar.

3. In mechanism of the character described, a clutch comprising driving means and a shaft adapted to be driven by said driving means, including a cup member having peripheral slots, a series of plates having ears extending into said slots, a series of plates interdigitated with said first series of plates and rotatable with said shaft, a collar slideable on said shaft toward and away from said plates, a bushing within said collar splined on the shaft and having screw-threaded connection to the collar, means for fastening the collar to the bushing, a spring bearing against said bushing for moving said bushing and collar toward said plates, and a lever for moving said collar away from said plates.

4. In mechanism of the character described, a clutch comprising driving means and a shaft adapted to be driven by said driving means, including a cup member having peripheral slots, a series of plates having ears extending into said slots, a series of plates interdigitated with said first series of plates and rotatable with said shaft, a backing plate and a split retaining ring at one end of the plates series, a collar at the other end slideable on said shaft toward and away from said plates, a bushing within said collar splined on the shaft and having screw-threaded connection to the collar, means for fastening the collar to the bushing, a spring bearing against said bushing for moving said bushing and collar toward said plates, a lever for moving said collar away from said plates, a ball bearing between said lever and said collar, and a groove and ring for retaining the ball bearing on said collar.

WILLIAM H. STAPLES.